July 27, 1937.  J. GOGAN  2,088,371
APPARATUS FOR HARDNESS TESTING
Filed Nov. 7, 1934  2 Sheets-Sheet 1
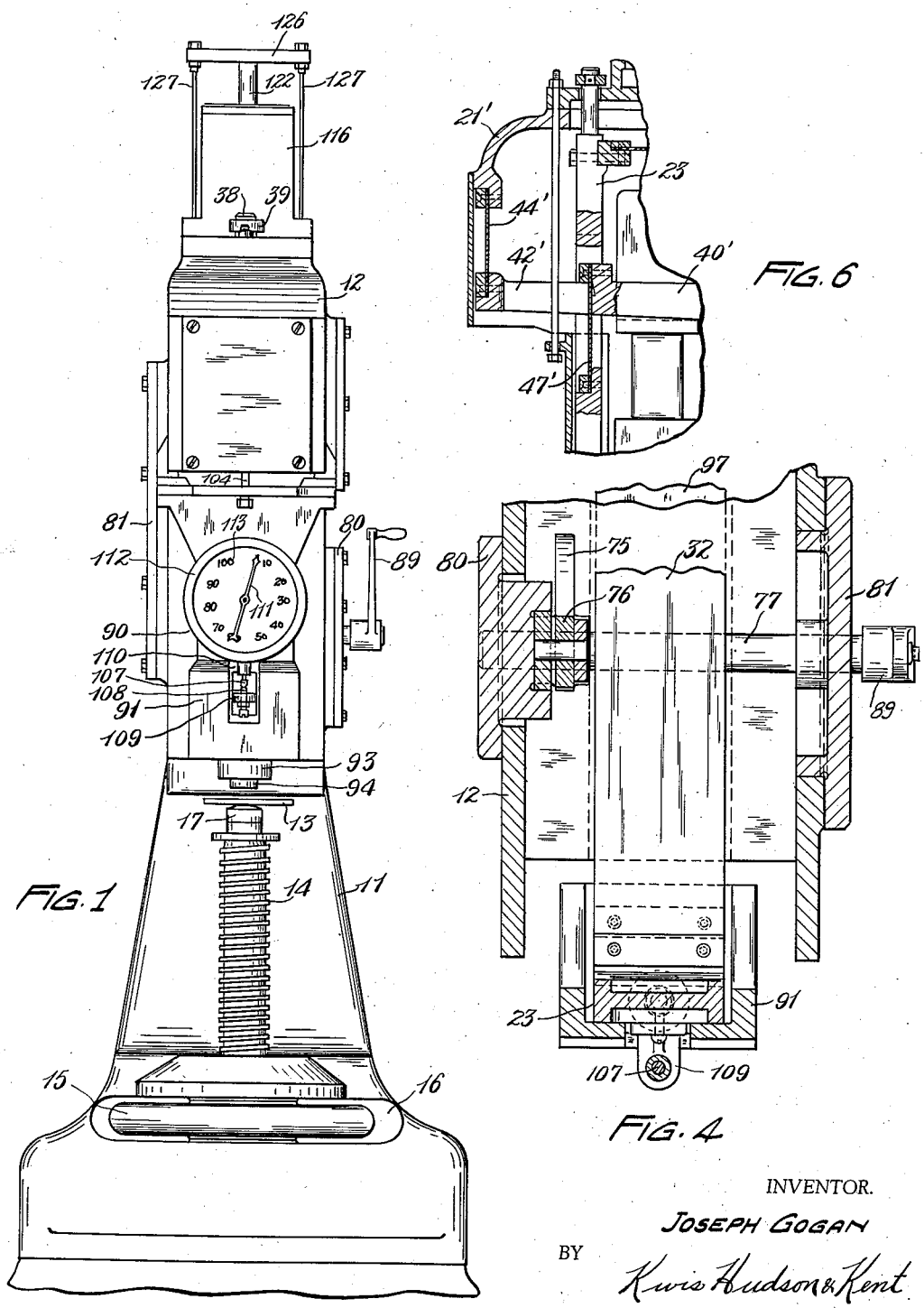
INVENTOR.
JOSEPH GOGAN
BY
Kwis Hudson & Kent
ATTORNEYS July 27, 1937.   J. GOGAN   2,088,371
APPARATUS FOR HARDNESS TESTING
Filed Nov. 7, 1934   2 Sheets-Sheet 2

INVENTOR.
JOSEPH GOGAN
BY
Kwis Hudson & Kent
ATTORNEYS

UNITED STATES PATENT OFFICE 2,088,371

APPARATUS FOR HARDNESS TESTING

Joseph Gogan, Lakewood, Ohio

Application November 7, 1934, Serial No. 751,867

11 Claims. (Cl. 265—12)

This invention relates to apparatus for hardness testing and, as one of its objects, aims to provide an improved hardness testing machine of very compact and economical construction and which is very efficient and reliable in operation.

Another object of this invention is to provide a testing machine, of the type referred to, having novel means for holding a test piece such that errors, due to deflection of the test piece by the anvil and deflection in the frame and other parts of the testing apparatus, will be substantially eliminated from the test reading.

Another object of the invention is to provide improved testing apparatus, of the type referred to, wherein novel means is employed for mounting the test spindle, or other parts of the apparatus, for movement substantially without friction.

A further object of this invention is to provide a novel testing machine, of the type referred to, wherein a test load of definite value presses a penetrator against a test piece for testing the surface hardness thereof, and wherein means is provided for applying an increased test load to the penetrator for testing the sub-surface hardness of the test piece.

It is also an object of this invention to provide an improved hardness testing machine, wherein the rate of application of the test load is regulated by a hydraulic check embodying means for maintaining the resistance fluid thereof at a substantially uniform temperature.

Other objects and advantages of the invention will be apparent from the following description, when taken in conjunction with the accompanying drawings, wherein, Fig. 1 is a front elevation of a testing machine constructed according to my invention.

Fig. 4 is a partial sectional plan view taken as indicated by line 4—4 of Fig. 2.

Fig. 6 is a partial sectional elevation taken through a testing machine similar to that of Fig. 2, but showing a different arrangement for one of the load supplying levers.

Figures 2, 3, 5:
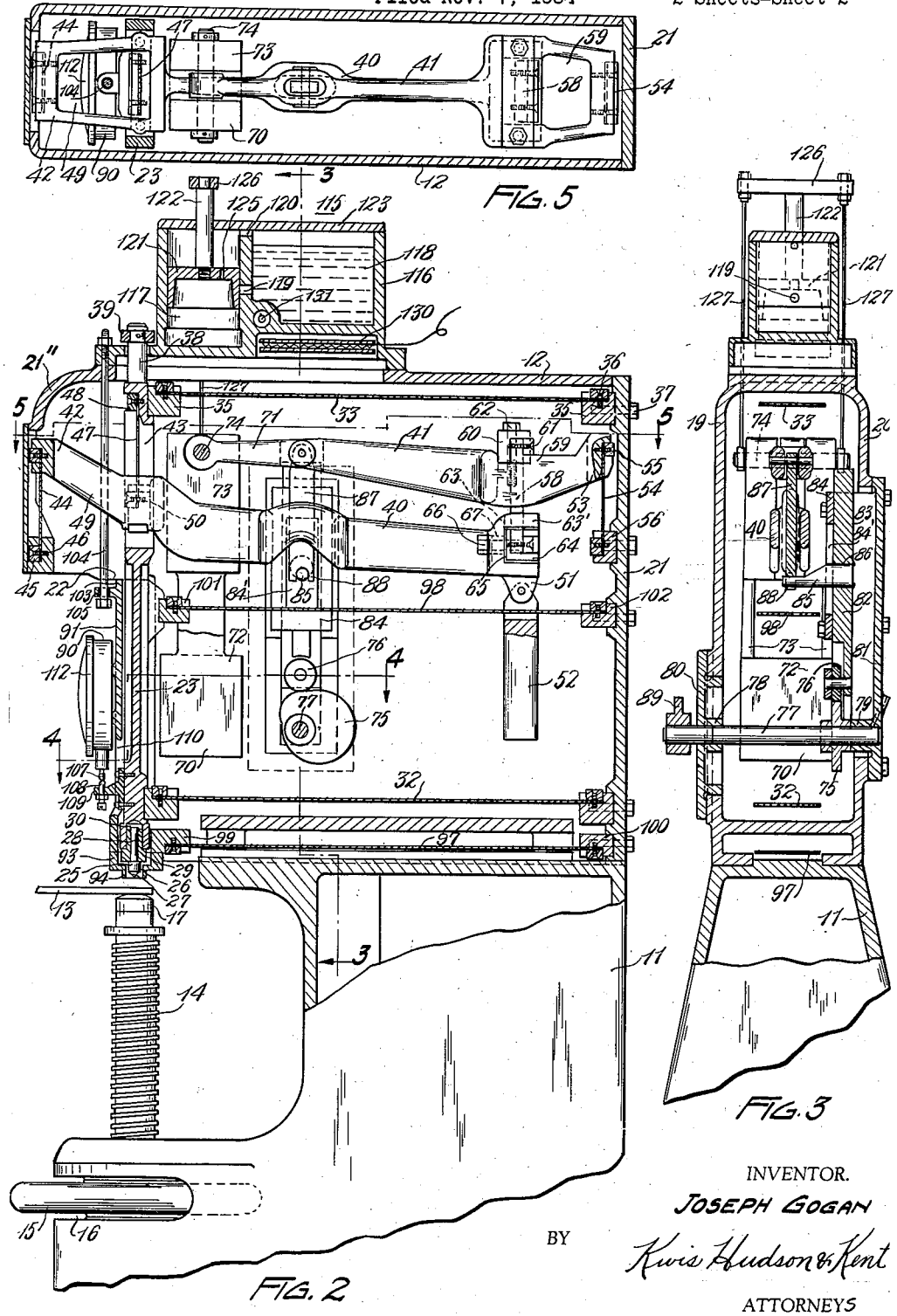
Fig. 2 is a side elevation of the machine with parts thereof broken away to more clearly show the mechanism of the machine.
Fig. 3 is a vertical sectional view of the machine taken as indicated by line 3—3 of Fig. 2.
Fig. 5 is a sectional plan view taken as indicated by line 5—5 of Fig. 2.

In the accompanying drawings, to which more detailed reference will now be made, I have illustrated what I now regard to be a preferred form of the hardness testing machine of my invention, but it will be understood, of course, that the invention is not to be regarded as limited to the particular form of machine herein illustrated but may be embodied in various other arrangements and devices.

In general, the improved testing machine of my invention is of the type wherein a test load of definite value causes a penetrator to be pressed into a test piece, and the depth of penetration caused by the test load is taken as an indication of the hardness of the piece being tested. As will be explained more fully hereinafter, my improved testing machine embodies means whereby the penetration reading of the gauge is rendered substantially independent of error factors, such as have heretofore been caused by stretch or deflection in the frame and parts of the testing machine and by distortion of the test piece other than that produced by the penetrator itself. It will be understood further from the following description that my improved testing machine provides for the accomplishment of a hardness test substantially without friction in the testing mechanism and that, as a very important feature, my invention provides for the testing of the surface hardness of a body and the testing of the sub-surface hardness of the body as a continuation of the surface hardness test.

As shown in the drawings, my improved hardness testing machine may be provided with a frame comprising a lower section or base 11 and an upper section or housing part 12. The base 11 may be of any suitable form of construction and provides a support for the housing part 12 and for the work, which in this instance is represented by the test piece 13. The base may be provided with a work supporting member in the form of a vertically adjustable screw 14, which is arranged to extend through openings of the base and through the hub of the hand wheel 15. The hub of this wheel is threaded to form a nut for the screw 14 and is retained in a recess 16 of the base so that the screw may be adjusted or lowered by rotation of the hand wheel. The work support may also include a suitable anvil 17 which is provided at the upper end of the screw and upon which the test piece 13 may be laid.

The upper section 12 of the frame is of hollow construction, as shown in the drawings, to provide both a housing and a support for the testing mechanism. This housing section is constructed with spaced side walls 19 and 20, between which the testing mechanism is arranged, and the space between the side walls is closed at one end of the housing section by means of the cover 21. The housing section may be of any desired size or shape, but is preferably constructed and arranged so that when mounted on the base 11, a portion of the housing section will be disposed above the work supporting screw 14. The side walls 19 and 20 of the housing section are also preferably extended laterally near the top of the machine to form the hollow extension 21″ which accommodates a part of the testing mechanism and which also provides an abutment or stop 22 for a purpose to be hereinafter explained.

My improved testing machine is provided with a substantially vertically disposed test bar or spindle 23, which is vertically movable in the housing section 12 and which is disposed above and in substantial axial alignment with the work supporting screw 14. My improved testing machine is also provided with a penetrator 25, arranged to engage the test piece and to transmit thereto the test load which is supplied through the test spindle 23.

The penetrator may be constructed and arranged in various ways, for example, it may, as shown in this instance, be constructed with a head 26, having a conical work contacting portion 27 provided with a diamond point and a shank 28 for removably mounting the penetrator in a supporting part such as the hollow bushing 29. It will be understood, of course, that the penetrator may have a contact portion which is of other than conical shape, for example, it may have a contact portion in the form of the usual Brinell ball. In this instance the penetrator 25 is carried by the test spindle 23, and to this end is provided with a recess 30 at the lower end thereof in which the penetrator carrying bushing 29 is removably mounted.

For mounting the test spindle 23 for movement in the frame section 12 substantially without friction, I provide a novel arrangement involving the use of flexible supporting and guiding members 32 and 33. These members may be constructed in the form of strips of sheet metal and are arranged with one end thereof connected to the test spindle and their other ends connected to some part of the frame section, such as the cover 21. As shown in the drawings, these supporting and guiding members are connected to the cover 21 and to the test spindle 23 at vertically spaced points, the member 32 being the lower member and connected to the spindle adjacent the lower end thereof, and the member 33 being the upper member which is connected to the spindle adjacent its upper end.

As a suitable means for connecting the members 32 and 33 with the test spindle and cover, these members may have their ends connected to anchor blocks 35 by means of screws 36, which anchor blocks are in turn connected to the spindle and cover by suitable screws 37 or the like. From the arrangement just described it will be seen that the members 32 and 33 form a supporting and guiding means for the test spindle 23, and that movement of the spindle relative to the test piece supporting screw 14 is permitted by flexing of the sheet metal strips. Since each of these sheet metal strips is disposed in a plane which is substantially normal to the axis of the spindle, as shown in the drawings, the strips will offer high resistance to lateral movement of the spindle and hence will maintain the latter in proper alignment with the axis of the screw, yet permitting free vertical movement of the spindle along that axis.

To limit the downward movement of the spindle and thus prevent this member from dropping out of position, I construct the spindle with a stem portion 38 which extends through an opening in the top wall of the housing section 12 and provide a nut 39 or other retaining member on this stem portion. The retaining member 39 will engage the top wall of the housing section 12 and thus prevent the test spindle 23 from dropping out of position.

For supplying a test load to the spindle 23 and to the penetrator 25 I provide test load supplying means which includes a compound lever arrangement consisting of levers 40 and 41. The lever 40 has its end 42 fulcrumed adjacent the spindle 23 and is arranged with its axis extending substantially normal to and intersecting the axis of the test spindle. To permit of this arrangement the test spindle 23 may be constructed with a suitable opening 43 near the upper end thereof through which the end 42 of the lever 40 extends. The end 42 of the lever 40 may be fulcrumed on the housing section 12 by employing a strip of flexible sheet metal 44, one end of which is secured to the housing section as by means of a clamping block 45 and screws 46, and the other end of which is connected with the lever end in a similar manner.

An operative connection between the lever 40 and the test spindle 23 may be established by means of another strip 47 of flexible sheet metal, one end of which is connected to the spindle above the opening 43, as indicated at 48, and the other end of which is connected to the lever. To permit the strip 47 to normally lie substantially on the axis of the test spindle 23, I construct the lever 40 with an opening 49 therein, into which the lower end of the strip extends. The lower end of the strip may be connected to the lever by suitable clamping means 50, similar to that already described.

The outer or free end of the lever 40 may be provided with a lug 51 to which a weight 52 of suitable value may be pivoted or otherwise connected. From the arrangement just described it will be seen that the load which is applied to the outer end of the lever by the weight 52 will be transmitted to the test spindle 23 through the flexible metal strip 47.

The lever 41 cooperates with the lever 40 for supplying a test load of increased value to the spindle 23, and may be arranged with its end 53 fulcrumed on the frame of the machine at the side thereof opposite that on which the fulcrum is provided for the lever 40. The fulcrum for the lever 41 may be formed by a strip 54 of flexible sheet metal, one end of which is connected to the lever end 53, as indicated at 55, and the other end of which is connected to the cover 21 as indicated at 56.

An operative load transmitting connection is provided between the lever 41 and the outer end of the lever 40. This connection may include a strip or link 58 of flexible sheet metal or other suitable material which extends through an opening 59 provided in the lever 41. The upper end of this strip is connected to an anchor block 60, as indicated at 61, and the anchor block is, in turn, secured to the lever 40 by means of screws 62. The lower end of the strip 58 extends through a slot 63 provided in the lever 40 adjacent the outer end thereof and is secured to anchor block 64, which is loosely seated in a recess 65 of the latter lever. The slot 63 extends between laterally projecting fingers 63′ and communicates with the recess 65. The block 64 is vertically shiftable in the recess 65 for a purpose to be explained hereinafter, and may be retained in such recess by one or more screws 66 extending through slotted openings 67 which communicate with the recess. The block 64 is constructed of greater length than the strip 58 is wide so that the ends of the block project laterally beneath the fingers 63'. While the strip 58 is flexible in character it will be understood of course that it has sufficient stiffness to act as a compression member and to transmit force from the lever 41 to the lever 40 without buckling.

In order that the increased test load which is supplied by the lever 41 may have a definite value, I provide a weight 70 which is carried by the free end 71 of the lever. This weight may be considerably heavier than the weight 52 of the lever 40, and may be constructed of any suitable material and may be of any desired shape. In this instance the weight is constructed with a solid lower part 72 and with spaced arms 73 extending upwardly therefrom. The space between the arms 73 accommodates certain parts of the testing mechanism, such as the lever 40 and the end 71 of the lever 41. The lever end 71 may be connected to the arms of the weight by means of a pivot pin 74 which extends through these parts.

Any suitable means may be provided for causing movement of the weights and actuation of the levers, but I find it desirable that this means should be such as to cause the test load to be supplied to the spindle 23 at a substantially uniform rate, so that the penetrator will be forced into the test piece slowly and uniformly rather than by impact or sudden movement. To this end the actuating means which serves to lift the weights also serves to regulate the downward movement of the weights. This means may include a rotary cam 75 and a cam follower, preferably in the form of the roller 76. The cam 75 is supported upon and driven by a shaft 77 which may be supported on the frame of the machine by being mounted in bearings 78 and 79 that are carried, respectively, by the cover plates 80 and 81. The cam follower 76 is pivoted to the lower end of a vertically reciprocable slide 82 which is operable in a guide track 83 carried by the cover plate 81. The slide 82 may be retained in the guide track by means of a cover plate 84 having an opening 84' through which a projection 85 of the slide extends. The projection 85 may be constructed as a bar or pin having one end thereof extending into an opening 86 of the slide and retained therein by welding or other means.

A separable connection is provided between the projection 85 of the slide and the lever end 71, so as to insure the full load of the weight 70 being applied to the lever 41. This separable connection may include a push rod 87, the upper end of which is pivoted to the lever 41 and the lower end of which is provided with fork arms 88 which engage and straddle the slide projection 85.

Rotation may be imparted to the shaft 77 by any suitable power means and, if desired, the actuation may be a manual one by providing a hand crank 89 which is keyed or otherwise secured to the shaft.

For indicating the hardness of the test piece, I provide an improved arrangement of indicating mechanism which accurately measures the extent the penetrator 27 is forced into the test piece. This indicating mechanism includes a gauge 90 which is mounted upon a gauge support 91. The gauge support 91 is movable relative to the frame of the machine and also relative to the test spindle 23, and during the making of a hardness test the gauge support rests upon the test piece.

The shape of the gauge support may be varied as may be required by the design or service of the machine of which it forms a part. In this instance the gauge support is an elongated member of substantially channel-like cross-section. The gauge support is arranged on the machine adjacent the test spindle 23, as shown in Fig. 2, with the channel recess of the gauge support accommodating the test spindle. For engaging the test piece the gauge support is provided at its lower end with a contact portion in the form of a cap 93. This cap is secured to the gauge support as by screws or other means and has a hollow extension 94 into which the penetrator 25 extends.

To provide for movement of the gauge support substantially independently of frictional contact with the test spindle or other parts of the machine, I employ a pair of flexible sheet metal strips 97 and 98 similar to the previously described strips 32 and 33. The lower strip 97 has one end thereof secured to an anchor block 99 which is, in turn, secured to the lower end of the gauge support and its other end is secured to an anchor block 100 which is, in turn, secured to the cover plate 21. The upper strip 98 has one end thereof secured to the upper end of the gauge support, as indicated at 101, and its other end secured to the cover plate 21, as indicated at 102. The strips 97 and 98 provide a mounting for the gauge support which permits the latter to move relatively freely in the vertical direction, but which prevents any tilting or lateral movement. To avoid interference between the strip 98 and the weight 52, the latter may have an opening of suitable size through which the strip extends.

Movement of the gauge support in an upward direction is limited, for a purpose to be hereinafter explained, by means of the abutment face 22 of the frame with which the upper end 103 of the gauge support cooperates. Downward movement of the gauge support may also be limited to prevent the latter from dropping out of position. Any suitable limiting means may be provided for this purpose, such as the elongated bolt 104 which is arranged with the head thereof immediately below the lug 105 of the gauge support so as to form a stop.

Distortion or penetration of the test piece is measured or indicated during the making of a test by the relative movement which takes place between the test spindle 23 and the gauge support 91. This relative movement is caused to act upon the gauge 90 by reason of the gauge actuating stem 107 cooperating with the adjustable contact 108 of a bracket 109 carried by the test spindle. The bracket 109 is accommodated by an opening 110 formed in the gauge support 91.

The gauge itself may be any suitable gauge which will accurately measure movement in thousandths of an inch or other appropriate increments. The gauge is preferably of the type having a pointer 111 which is actuated in one direction by inward movement of its stem 107 and in the other direction by a spring contained in the housing of the gauge. This gauge also has a rotatable rim 112 by means of which the face of the dial bearing the indications 113 may be rotated or adjusted relative to the pointer 111.

For preventing the weights 52 and 70 from being lowered too rapidly by rotation of the cam 75, which, as explained above, would result in an inaccurate test, I provide a check device 115 which acts upon the test load supplying mechanism. This check device, as best shown in Fig. 2 of the drawings, is provided with a housing 116 containing a cylinder 117 and a fluid reservoir 118. Fluid is supplied from the reservoir to the cylinder through an opening 119 and is returned from the cylinder to the reservoir through an opening 120. A piston 121 is arranged for reciprocation in the cylinder and has a piston rod 122 projecting through the cover 123 of the housing. To produce the desired dash-pot effect the piston may be provided with a restricted opening 125, through which the resistance fluid is forced after the downward movement of the piston has closed the opening 119.

An operative connection between the check device and the test load supplying mechanism may be established by providing the piston rod with a cross-bar 126, the ends of which are connected to the ends of the pivot pin 74 by means of rods 127. The check device offers little or no resistance to upward movement of the weight 70, but the downward movement of the weight is retarded and timed by the dash-pot action produced as the result of the restricted flow of fluid through the piston opening 125.

To eliminate the effects which would be produced by changes in the viscosity of the resistance fluid of the check device, I provide means for maintaining the resistance fluid at a substantially uniform temperature. This means may, as shown in the drawings, comprise an electric heater 130 which is arranged adjacent some suitable portion of the check device, such as beneath the reservoir 118 and a thermostatic switch 131. The thermostatic switch is also suitably located on the check device as adjacent the reservoir and is suitably connected with the electric heater 130 and with the source of current supply. The thermostatic switch automatically controls the supply of heat to the resistance fluid by the electric heater and thus maintains the resistance fluid at a substantially uniform temperature, such that the resistance to flow of the fluid through restriction 125 will not be affected or varied as the result of temperature changes in the room or building in which the testing machine is located.

In the operation of my improved testing machine, the crank 89 is first rotated to the extent that the weights 52 and 70 are held in an elevated position by the cam 75. A body to be tested, such as the test piece 13, is laid upon the anvil 17 and by rotation of the hand wheel 15 the screw is elevated to bring the test piece into engagement with the contact portion 94 of the gauge support. Further rotation of the hand wheel 15 causes the gauge support to be lifted by the test piece until the upper end 103 of the gauge support engages the abutment face 22 of the frame, whereupon the test piece is clamped and held between the anvil and the gauge support. During this upward movement of the test piece by the screw 14, the test piece is not engaged by the penetrator 27 because the latter is at this time in a retracted position in the contact portion 94.

By rotating the crank 89 through a given distance, the weights 52 and 70 are lowered to the extent that the load of the weight 52 is applied to the penetrator through the lever 40 and the test spindle 23. At this time, that is to say, while the load of the weight 52 and lever 40 is applied to the penetrator, the load of the weight 70 and the lever 41 is supported by the cam 75 and is prevented from being transmitted to the lever 40 by the lost motion connection provided between the outer end of the lever 40 and the lever 41. In other words, when the test load of the weight 52 and the lever 40 is acting on the penetrator the block 64 is, so to speak, floating in the recess of the outer end of the lever 40, and no load is being transmitted to this lever from the lever 41.

The application of the load provided by the weight 52 and the lever 40 to the penetrator causes the latter to be pressed into the test piece 13 for a definite distance which is commensurate with the value of the test load. This penetration of the test piece causes relative movement to occur between the spindle 23 and the gauge support 91, and this relative movement actuates the gauge through the bracket 109 and the gauge stem 107.

The value of the weight 52 is so selected with respect to the character of the test piece 13 that the load supplied by the weight and the lever 40 will cause only surface penetration of the test piece, and hence the reading obtained from the gauge upon the application of this test load is an indication of the surface hardness of the test piece.

After the testing of the surface hardness of the piece, as just explained, the testing operation is continued as a sub-surface test of the piece. In the continuation of the test the operator first rotates the rim 112 of the gauge to bring the zero indication beneath the pointer 111. The operator then moves the hand crank 89 further in the same direction to cause further rotation of the cam 75. This further rotation of the cam allows the lever end 71 and the weight 70 to be lowered which causes an increased test load to be transmitted from the lever 41 to the lever 40 through the connecting strip 58. This increased test load is supplied to the penetrator through the lever 40 and the test spindle 23 and causes the penetrator to be forced into the sub-surface material of the test piece. This further movement of the penetrator is indicated by the pointer of the gauge and may be taken as an indication of the sub-surface hardness of the piece being tested.

After observing the gauge reading for the sub-surface hardness of the test piece the operator rotates the hand crank 89 further to cause the cam 75 to lift the weights 70 and 52, thereby removing the test load from the penetrator. Thereafter the operator rotates the hand wheel 15 in a direction to lower the screw 14 which permits the test piece 13 to be removed from between the anvil and the gauge support.

In Fig. 6 of the drawings I have shown a slightly different arrangement for the mounting of the lever 40', wherein the lever end 42' is fulcrumed on the frame portion 21' by means of the flexible metal strip 44', and the lever end is connected to the test spindle 23' by means of the flexible strip 47'. In this arrangement it will be noted that downward swinging movement of the lever 40' upon the fulcrum formed by the strip 44' will result in the strips 44' and 47' being placed under compression during the making of a test instead of being in tension as they would be in the arrangement of Fig. 2.

From the foregoing description and the accompanying drawings it will now be readily seen that I have provided a very compact and efficient form of testing machine by means of which the surface hardness as well as the sub-surface hardness of a test piece can be accurately tested. It will also be noted that the sub-surface hardness test can be carried out as a continuation of the surface test without requiring extensive resetting or adjustment of the machine nor removal of the test piece. From the testing machine arrangement herein disclosed it will also be seen that the test readings obtained from the gauge are substantially independent of errors which would otherwise be produced by deflection or bending of the test piece or by the presence of dirt between the test piece and the anvil, or by stretch or distortion occurring in the frame or other parts of the machine. It will be observed furthermore that my improved testing machine provides for a clamping and holding of the test piece during the making of the surface and sub-surface hardness tests, and that the movement of the test spindle and various other parts of the machine takes place substantially without friction by reason of the novel form of connection provided between the moving members. It will also be observed that my improved testing machine embodies a novel form of check device by means of which the rate of application of the test load is very accurately regulated independently of temperature changes.

While I have illustrated and described the improved testing apparatus of my invention in a detailed manner, it will be understood, of course, that I do not wish to be limited to the precise details of construction and arrangements of parts herein disclosed, but regard my invention as including such changes and modifications as do not involve a departure from the spirit of the invention and the scope of the appended claims.

Having thus described my invention, I claim:

1. In testing apparatus the combination of a frame, a pair of members movable relative to said frame and to each other, means for limiting movement of one of said members in one direction, a movable support adapted to cooperate with said one member for clamping a test piece therebetween, test load supplying means having operative connection with the other of said members, a penetrator carried by said other member, and test piece distortion indicating means comprising a gauge carried by said one member and a gauge actuator carried by said other member.

2. In testing apparatus the combination of a frame, a hollow gauge support movable relative to the frame, means on the frame for limiting movement of the gauge support in one direction, a gauge on said gauge support, test load supplying means including a spindle movable in said gauge support, means cooperating with said gauge support for clamping a test piece therebetween, a penetrator arranged to engage the test piece and to transmit the test load thereto, and means carried by said spindle for actuating said gauge.

3. In testing apparatus the combination of a frame, a hollow gauge support movable relative to the frame, means on the frame for limiting movement of the gauge support in one direction, a gauge on said gauge support, test load supplying means including a spindle movable in said gauge support, means cooperating with said gauge support for clamping a test piece therebetween, a penetrator on said spindle for engagement with the test piece, and means on said spindle for causing said gauge to indicate the penetration of the test piece.

4. In testing apparatus the combination of a frame, a hollow gauge support movable relative to the frame, means on the frame for limiting movement of the gauge support in one direction, a gauge on said gauge support, test load supplying means including a spindle movable in said gauge support, means cooperating with said gauge support for clamping a test piece therebetween, a penetrator on said spindle for engagement with the test piece, said gauge support having an opening therein adjacent the gauge, and means on said spindle extending through said opening for actuating said gauge.

5. In testing apparatus the combination of a frame, an elongated substantially vertically disposed movable gauge support, a stop on said frame for limiting upward movement of the gauge support, a gauge on said support, test load supplying means including a substantially vertically disposed movable spindle adjacent said gauge support, substantially vertically adjustable means on said frame adapted to cooperate with said gauge support for clamping a test piece therebetween, a penetrator arranged to engage the test piece and to transmit the test load thereto, and means carried by said spindle for actuating said gauge.

6. In testing apparatus the combination of a frame, a pair of members movable relative to each other and to said frame, one of said members being an elongated hollow part and the other being a spindle disposed in said hollow part, means mounting said members on said frame to permit said relative movement to take place substantially without friction comprising a pair of spaced flexible metal strips having connection with said hollow part and the frame and a second such pair of strips having connection with said spindle and the frame, test load supplying means having operative connection with said spindle, a penetrator arranged to engage a test piece and to transmit the test load thereto, and means responsive to relative movement between said members for indicating test piece penetration.

7. In testing apparatus the combination of a supporting member, a member movable relative to the supporting member, a penetrator associated with one of said members for engagement with a test piece, a lever having operative connection with said movable member, means for loading said lever to a definite value to test the surface hardness of said test piece, a second lever, means for loading said second lever to a definite value for testing the sub-surface hardness of the test piece, and a link providing an operative connection between said levers, said link having connection with the first mentioned lever adjacent an end thereof and connection with an intermediate portion of said second lever, one of such connections of the link being a lost motion connection whereby the surface and sub-surface test loads may be applied in succession with the load of the first mentioned lever acting through such lever substantially independently of the second lever and the load of the second lever subsequently acting through both the second lever and the first mentioned lever.

8. In testing apparatus the combination of a supporting member, a member movable relative to the supporting member, a penetrator associated with one of said members for engagement with a test piece, a lever having operative connection with said movable member, means for loading said lever to a definite value to test the surface hardness of said test piece, a second lever, means for loading said second lever to a definite value for testing the sub-surface hardness of the test piece, and means providing a lost-motion connection between said levers whereby the surface and sub-surface test loads are applied to the test piece in succession and with the load of said second lever acting through the first mentioned lever.

9. In testing apparatus the combination of a frame, a pair of members movable relative to each other and to said frame, one of said members being an elongated hollow part and the other being a spindle disposed in said hollow part, means mounting said members on said frame to permit said relative movement comprising a pair of substantially parallel flexible metal strips having connection with said hollow part and the frame and a second pair of substantially parallel strips having connection with the spindle and the frame, said pairs of strips extending at substantially right angles to the axes of the members of said pair, test load supplying means having operative connection with said spindle, a penetrator arranged to engage a test piece and to transmit the test load thereto, and means responsive to said relative movement between said members for indicating the test piece penetration.

10. In testing apparatus the combination of a frame having a test piece support thereon, a spindle mounted on said frame for movement toward and from said support, a lever having operative connection with said spindle, one end of said lever being fulcrumed on the frame at one side of the spindle and having its other end extending outwardly at the other side of the spindle, a second lever fulcrumed on the frame at a point relatively remote from the spindle and having an end thereof extending toward the spindle, means for applying a load to said other end of the first mentioned lever, means for applying a load to said end of the second lever, and means providing a lost motion connection between the second lever and said other end of the first mentioned lever.

11. In testing apparatus the combination of a frame having a test piece support thereon, a spindle mounted on said frame for movement toward and from said support, said spindle having an opening therein, a lever extending through said opening and having operative connection with the spindle, one end of said lever being fulcrumed on the frame at one side of the spindle and having its other end extending outwardly at the other side of the spindle, a second lever fulcrumed on the frame at a point relatively remote from the spindle and having an end thereof extending toward the spindle, means for applying a load to said other end of the first mentioned lever, means for applying a load to said end of the second lever, and means providing a lost motion connection between the second lever and said other end of the first mentioned lever.

JOSEPH GOGAN.